UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT PYROXYLIN PLASTIC COMPOSITION.

SPECIFICATION forming part of Letters Patent No. 622,291, dated April 4, 1899.

Application filed December 27, 1898. Serial No. 700,352. (No specimens.)

*To all whom it may concern:*

Be it known that I, JOHN H. STEVENS, a citizen of the United States, residing in the city of Newark, county of Essex, and State of New Jersey, have invented certain new and useful Improvements in Transparent Pyroxylin Plastic Compositions, of which improvements the following is a specification.

My compositions are intended principally for use in the arts as imitations of amber, glass, and tortoise-shell. I have found by a long experience that the essential characteristics for such imitations are solidity, transparency, plasticity under heat or capability of being pressed into different shapes in hot dies or otherwise when in a hard condition, and permanency or resistance to the action of time or elevated temperatures.

While the different ingredients from which I form my compositions are well known and at least one of them has been used or suggested to be used in connection with a certain kind of pyroxylin, they have not, so far as I am aware, been brought into the peculiar new relations which I have demonstrated form a composition possessing entirely new properties of great value in this art. The property of permanency in these transparent compounds is of extraordinary importance, because it is closely associated with the danger of destructive fires and deterioration of valuable goods.

There are plenty of known means for securing stability in non-transparents or even in clouded transparents; but the arts demand a high transparency in order to successfully imitate amber and glass effects, and it has been extremely difficult to secure high transparency and stability at the same time. Hence any composition of matter which gives the desired properties has to depend on study and experiment, especially with proportions, the properties of substances, and their behavior under special conditions of manufacture, such as their reaction or compatibility with other necessary ingredients of the transparent compounds.

It frequently happens, as I have already pointed out in my United States Patent No. 519,987, that the mere employment of a substance in connection with pyroxylin does not necessarily disclose its usefulness or the peculiar properties which it may give the compound under various conditions of treatment or in various combinations. This is illustrated in the history of the art. Pyroxylin (which is a product of the action of nitric and sulfuric acids on cellulose, either in the form of cotton or paper) is by reason of its varying solubility in various menstrua a basis for a large variety of compounds whose applications are almost numberless. It is because of these many applications and the peculiar properties demanded for their many uses that inventors have given them so much attention. Many hundreds of patents have been issued, both in this country and abroad, for various processes, mixtures, and applications in this art. First, the pyroxylin itself has been made of many kinds and by many processes and subjected to various treatments; second, the compounds have been made by numerous special processes; third, liquid solvents in great variety have been discovered and applied; fourth, a number of solid solvents, or solvents which when melted by heat or dissolved in a liquid act on the pyroxylin, have been discovered; fifth, various non-solvent substances have been used to modify the character of the compounds and render them susceptible of special application; sixth, special combinations or the association of old ingredients with new processes have advanced the art, and such is the peculiar nature of pyroxylin and its compounds that these special combinations of known ingredients and their uses with special processes have formed one of the most important fields for improvement, and, seventh, the applicability of special compounds to particular uses has formed the basis for numerous inventions.

The present invention is based on the discovery of new properties in certain solid bodies not necessarily in themselves solvents of pyroxylin and also in their action with other ingredients and the necessary proportions to be used, and its place in this field is best understood by referring to the history of a somewhat similar line of invention. Thus by some inventors certain inorganic salts have been proposed to be used to render pyroxylin compounds non-inflammable, examples of such salts, for instance, are chlorid of calcium, chlorid of zinc, &c.; but in order to effect such result they must necessarily be used in large proportions to the amount of pyroxylin present. So, also, some other salts, such as chlorate of potash and nitrate of soda, have been added by some inventors to the explosive varieties of nitrocellulose in order to increase the explosive power. Still again, certain salts have been proposed to be used when added to non-solvents of pyroxylin, like ethyl alcohol, in order to make the mixture a solvent of a certain kind of pyroxylin; but none of these uses is in any way analogous to my invention, which relates solely to the discovery that certain salts when added to pyroxylin compounds in certain proportions have the effect of neutralizing the nitrous acid developed in such compounds, and thereby tend to preserve these compounds from deterioration, while at the same time they do not interfere with the transparency of the compound, which is so desirable for many purposes. That the discovery of the utility of the salts mentioned in this specification for this purpose is foreign to the various inventions of prior inventors recited above is shown by the fact that many of the inorganic salts and equivalent substances mentioned by them as useful for the several purposes above mentioned are wholly unsuited to the purpose of my invention.

The salts that I refer to and which are included within my invention are known as the "calcium" salts of the volatile monatomic fatty acids. The principal acids of this group are formic, acetic, propionic, butyric, and valeric acids. The salts resulting from the chemical combination of these acids with calcium are calcium formate, calcium acetate, calcium propionate, calcium butyrate, and calcium valerate. These are the salts which form one part of my new transparent composition of matter, consisting, essentially, of pyroxylin, camphor, a liquid solvent, and an antacid or preserving substance. I have used these salts successfully and have determined by experiment their relative value for the purpose. While they all possess more or less antacid power, I prefer to use the salts which are most easily soluble, especially in alcohol or wood spirit, because these are the solvents most commonly used in the art. While an ordinary mechanical mixture of the preserving agent with the pyroxylin compounds is sufficient to impart stability, the employment of a solution of the salt permits a better distribution, so that every part of the pyroxylin or its compounds is protected by reason of intimate contact with the salt.

In making my new composition I mix the ordinary soluble pyroxylin used for transparent compounds with a liquid solvent and sufficient camphor to give the final product molding properties. The liquid solvent is preferably wood-spirit and is used in sufficient proportion to produce a mass which can be masticated in the rollers or mixing machinery, although I do not confine myself to any particular proportion so long as the final result is a solid transparent compound. I introduce the antacid, preferably in solution in wood-spirit, although it can be introduced in the form of powder, in which case the mastication with the solvent and other ingredients results in a thorough incorporation of the salt. The well-known menstruum acetate of methyl can be used in place of wood-spirit, if desired, or, in fact, any good solvent which will dissolve the antacid salt or permit it to become incorporated with the pyroxylin.

In making these compounds for the various purposes for which they are used I find that calcium propionate is preferable, although for cheap purposes the calcium acetate can be used under certain limitations, as hereinafter set forth. I have discovered in operating with these salts that those which dissolve most readily in the solvent used to form the compounds are the most powerful in their preserving effects. The calcium formate, for instance, is not as strong in antacid power as the propionate. It is less easily soluble and gives only a moderate transparency. Nevertheless, it is a fair antacid. I have employed calcium propionate with considerable success in forming pyroxylin sheets of high transparency. It is especially useful in tortoise-shell effects. In general, the propionate and butyrate of calcium are best for highly-transparent compounds and the calcium acetate for those of moderate transparency. The formate and valerate of calcium have to be used under extreme limitations, as they give the least transparency of any of this group. The butyrate and valerate have a more or less offensive odor. As to proportions, I find that about one per cent., by weight, of the salt to the pyroxylin is sufficient for good results, though this proportion will vary according to the particular salt used and the special character of the result wanted, as hereinafter set forth.

Pyroxylin compounds made with urea are sometimes contaminated by a product resulting from the reaction between the urea and the nitro element present. This product is presumably nitrate of urea. At any rate, compounds made with urea when subjected to severe treatment, like heat in contact with metal plates, are liable to a smearing of the surface of the sheets and a staining or smutching of the polishing-plates or metal dies. Urea-pyroxylin compounds are also apt to blister easily under heat. In using these salts of calcium, especially those stated to be preferred, like calcium propionate, these defects do not occur, and imitation tortoise-shell sheets, for instance, made with calcium propionate as the preserving agent present a better surface and the polishing-plates last longer than is the case with urea compounds.

The art of manufacturing transparent pyroxylin compositions is well known, as is also the difficulty which the operators have experienced in making these compositions so that they would be unchangeable by time or the influence of elevated temperatures, such as are used in molding. Many antacid substances have been used for this purpose; but, as a rule, they have failed to give the requisite transparency either by lack of solubility in the menstrua employed or non-compatibility in other respects.

While I only confine myself to the proportions and ingredients necessary to produce solid transparent compositions, I would state that good proportions are, by weight, one hundred parts of soluble pyroxylin, forty to fifty parts of camphor, fifty to seventy-five parts of wood-spirit, and one part of calcium propionate. I have discovered that solvents in which the calcium propionate is insoluble can be used with the compound, provided the antacid salt is first dissolved in wood-spirit. I have also discovered that camphor, which by itself is incompatible with these calcium salts, is entirely compatible with them when used as described. There is no separation or consequent cloudiness, which would be fatal to the effects desired. I prefer the roll method of conversion.

I use no more than three per cent. of the calcium acetate, calcium valerate, and calcium of formate to the amount of pyroxylin. More than this would make a compound unsuited for my purposes, as it would either lack the requisite transparency or possess other undesirable properties. For instance, I find that when five per cent. of calcium acetate is used the material is so clouded as to be far above the limits of transparency. Even at two per cent. the valerate and formate lose considerable transparency. Hence there are top limits of proportion beyond which these salts would neither make a successful transparent compound nor indicate the success which attends their use in small proportions. To get even fair transparency the formate and valerate of calcium and also the acetate should be used in even less than one-per-cent. proportions. I have obtained good transparency in thin sheeting by using one-half of one per cent. of the calcium acetate. I would therefore advise that for ordinary purposes the formate, valerate, and acetate be used in a proportion not exceeding one per cent. to the amount of pyroxylin in the compound and never more than three per cent.

While the butyrate and propionate of calcium are related to the rest of the salts mentioned, they possess such excellent properties as to stand out beyond the rest as a preferred group. In a two-per-cent. proportion, for instance, they are still highly transparent in sheets having a thickness of one-quarter of an inch, and even more can be used without any detriment, except a gradual increase in the yellowness as the higher proportions are used and an unpleasant odor in the butyrate compounds. On account of these and other undesirable properties I limit myself to not more than five per cent. of either the propionate or butyrate. Hence the proportions in which these new antacid salts of calcium are to be used will range from the lowest possible amount up to five per cent., according to the salt used.

While I am unable to explain why a basic substance already saturated with a corrosive acid can act as a preserving agent and prevent the deleterious action of the corrosive nitro compounds in decomposing pyroxylin, my experiments have, nevertheless, demonstrated this to be a fact. I can only state that it seems to depend on the nature of the acid or other radicle present in the preserving agent. Even when the elements contained in these preserving salts are united to other substances—for instance, in neutral salts or compounds containing dissimilar acid radicles—the resultant salt or compound possesses preserving power at least in proportion approximating to the amount of such element present. As an instance of the effect of the nature of the acid or other radicle present in these preserving salts I can state that I have found by experiment that while propionate of calcium is a good antacid substance in connection with pyroxylin, chlorid of calcium has so little antacid power in it that my tests have failed to disclose it, and, at any rate, it can be considered as totally inefficient as an antacid for my compositions. Similarly, I find that salts containing two or more bases are good preservers according to the properties of their constituents.

Perfect solubility of the salt or compound in the solvent employed and the ability to form highly-transparent effects do not give the salt or compound antacid power, for I have found that the chlorid of calcium dissolves in wood-spirit and forms a close highly-transparent combination with the pyroxylin compounds while it is of no use for antacid purposes. In fact, hygroscopic substances, as some of the chlorids—for instance, chlorid of calcium—while they may be capable, in connection with alcohol and a special pyroxylin, of making a "celluloid" useful for artificial silk, filaments for lamps, and a certain class of varnishes, are totally incapable of forming a useful imitation of amber, tortoise-shell, or glass having the requisite surface effects. I have long known by experience that chlorid-of-calcium compounds attract moisture and become wet on the surface, which property would prevent the sale of such articles as tortoise-shell combs, amber pipe-bits, or transparent sheets for decorative purposes, for all of which my invention is specially applicable.

While the solution of chlorid of calcium on the surface can be washed away to some extent, it is always liable to exude from the body of the material and form fresh deposits. Such materials are either incapable of polish or will not retain their polish by reason of this exudation.

I am aware that calcium carbonate has been used as an antacid in pyroxylin compounds. In this case the theory is that the calcium is combined with a non-corrosive and harmless acid radicle, which when released immediately passes off in the gaseous state. The pyroxylin products made with calcium carbonate are not as transparent as those made with calcium acetate, for instance, and the preserving power of the acetate is higher. Its penetrating power also gives it superiority over the carbonate. The calcium carbonate is quite distinct also by reason of insolubility in alcoholic menstrua.

By "solid transparent pyroxylin compounds" I mean those which permit the transmission of light—for instance, sheets, rods, or articles made in imitation of amber, glass, tortoise-shell, and horn.

I am aware that the calcium acetate, though practically insoluble in alcohol, has possibly been claimed as a solvent of the tetranitrocellulose grade of collodion pyroxylin in connection with ethyl alcohol in certain solvent proportions and as a substitute and equivalent for calcium chlorid and other chlorids of the metals and alkaline earths, as well as oxalic, citric, and carbolic acids; but these substances are not equivalents in my invention, as I have pointed out, and especially as I do not use a pyroxylin which is soluble in a solution of calcium acetate in ninety-five per-cent. ethyl alcohol. My experiments have demonstrated that all proportions in which the calcium acetate has been recommended to be used would fail to give a final transparent composition of matter. I am not aware, therefore, that the acetate of calcium has ever been used in making a plastic or moldable imitation of glass, horn, amber, or tortoise-shell, or that it has been used in such proportions as would form such a composition, or that any one before my experiments and the reduction to practice of this invention has known or described the valuable property of calcium acetate in my compounds or has even suggested its utility with camphor.

While I have found that calcium acetate and the rest of my new group are applicable as antacids for purposes outside of the transparent pyroxylin compounds of the present invention—for instance, smokeless powders and lacquers—nevertheless, as there are other notable antacid substances useful for nontransparent compounds and because of the extraordinary utility of these new antacid substances in solid transparent moldable compounds, I have confined my claims to this class of compounds.

Wherever I have mentioned "camphor" it is to be understood that I can employ any equivalent solid solvent which will give the compound the molding property or the property of plasticity under heat, as is well understood. Many such substances are known. I do not, therefore, claim the broad use of these new antacid substances with pyroxylin in all proportions, but I include in my invention any use of my proportions of calcium acetate or the rest of the group in a solid transparent camphor compound as a practice of my invention, whether the compound is made as I have described or by adding to an ordinary transparent camphor compound sufficient alcohol and calcium acetate to give my proportions and results, for I have found that the usefulness of the calcium acetate as an antacid in my compounds was unknown in the art until I made my invention.

For the reasons above described I include in my invention the present group of calcium salts of the volatile monatomic fatty acids as preserving agents for transparent pyroxylin compounds, whether the salts are simple, compound, mixed, or combined chemically with other salts or compounds; but I exclude any combination of the salts of this specification with the halogen acids, for such compounds have already been secured by me in United States Patent No. 614,514, of November 22, 1898, which patent includes such substances, for instance, as chlorformate of calcium, chloracetate of calcium, chlorpropionate of calcium, &c.

Having thus fully described my invention, what I claim, and desire to secure by Letters Patent, is—

1. A transparent composition of matter consisting of pyroxylin as described, camphor, a liquid solvent and a preserving calcium salt of a volatile monatomic fatty acid, the said salt being present within the limits of the proportions specified.

2. A solid transparent composition of matter consisting of pyroxylin as described, camphor and a preserving calcium salt of a volatile monatomic fatty acid, the said salt being present within the limits of the proportions specified.

3. A transparent solid composition of matter containing pyroxylin, camphor, and a preserving calcium salt of a volatile monatomic fatty acid belonging to the group which consists of calcium propionate and calcium butyrate, the said salt being present in substantially the proportions specified.

JOHN H. STEVENS.

Witnesses:
WALTER P. LINDSLEY,
WM. F. VAN PELT.